US011619337B2

(12) United States Patent
Imada et al.

(10) Patent No.: US 11,619,337 B2
(45) Date of Patent: Apr. 4, 2023

(54) POWDER COATING MATERIAL, LAMINATE AND PIPE

(71) Applicant: DAIKIN INDUSTRIES, LTD., Osaka (JP)

(72) Inventors: Hirotake Imada, Osaka (JP); Yasukazu Nakatani, Osaka (JP); Tomohiro Shiromaru, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 1081 days.

(21) Appl. No.: 16/326,477

(22) PCT Filed: Aug. 3, 2017

(86) PCT No.: PCT/JP2017/028233
§ 371 (c)(1),
(2) Date: Feb. 19, 2019

(87) PCT Pub. No.: WO2018/037874
PCT Pub. Date: Mar. 1, 2018

(65) Prior Publication Data
US 2021/0278026 A1 Sep. 9, 2021

(30) Foreign Application Priority Data

Aug. 26, 2016 (JP) .............................. JP2016-165980

(51) Int. Cl.
*F16L 58/10* (2006.01)
*C09D 5/03* (2006.01)
*C09D 5/18* (2006.01)
*C09D 163/00* (2006.01)
*C09K 21/12* (2006.01)

(52) U.S. Cl.
CPC .......... *F16L 58/1009* (2013.01); *C09D 5/031* (2013.01); *C09D 5/033* (2013.01); *C09D 5/18* (2013.01); *C09D 163/00* (2013.01); *C09K 21/12* (2013.01)

(58) Field of Classification Search
CPC combination set(s) only.
See application file for complete search history.

(56) References Cited

U.S. PATENT DOCUMENTS

| 2008/0234412 | A1  | 9/2008 | Yamamoto et al. |
| 2012/0095133 | A1* | 4/2012 | Vyakaranam ........ C09D 163/00 523/435 |
| 2018/0105545 | A1* | 4/2018 | Eißmann ............ C08G 59/4071 |

FOREIGN PATENT DOCUMENTS

| CN | 203223708 U  | 10/2013 |
| CN | 104745048 A  | 7/2015  |
| JP | 59-078268 A  | 5/1984  |
| JP | 9-249737 A   | 9/1997  |
| JP | 2000-226538 A| 8/2000  |
| JP | 2010-155893 A| 7/2010  |
| JP | 2012-255139 A| 12/2012 |
| JP | 2015-183121 A| 10/2015 |
| TW | 200540216 A  | 12/2005 |

OTHER PUBLICATIONS

International Search Report for PCT/JP2017/028233 dated Sep. 12, 2017 [PCT/ISA/210].
International Preliminary Report on Patentability with a Translation of Written Opinion issued from the International Bureau in counterpart International Application No. PCT/JP2017/028233, dated Feb. 26, 2019.
Lihua et al., "Application of flame retardant of nano-sized aluminum hydroxide and its development prospects", Chemical Technology Market, Apr. 2008, vol. 31, No. 4, 11 pages total.
Yu et al., "Handbook of Flame Retardant Materials", Qun Zhong Press, Revised Version, 1997, ISBN 7-5014-1517-X, 6 pages total.

* cited by examiner

*Primary Examiner* — Joseph D Anthony
(74) *Attorney, Agent, or Firm* — Sughrue Mion, PLLC

(57) ABSTRACT

A powder coating material including a main material resin containing an epoxy resin; a phosphorus flame retarder; and at least one inorganic particulate substance selected from metal hydroxides and hydrous metal compounds. The inorganic particulate substance has an average particle size of 0.01 to 9 μm. The inorganic particulate substance is present in an amount of 80 to 200 parts by mass relative to 100 parts by mass of the main material resin.

11 Claims, No Drawings

POWDER COATING MATERIAL, LAMINATE AND PIPE

CROSS REFERENCE TO RELATED APPLICATIONS

This application is a National Stage of International Application No. PCT/JP2017/028233 filed Aug. 3, 2017, claiming priority based on Japanese Patent Application No. 2016-165980 filed Aug. 26, 2016.

TECHNICAL FIELD

The invention relates to powder coating materials containing an epoxy resin, laminates, and pipes.

BACKGROUND ART

In plants involving the use of a variety of gases and chemicals, gasified matter has corrosiveness in many cases. Exhaust piping and exhaust ducting therefore need to have corrosion resistance. Further, in consideration of an explosion risk due to occurrence of fire, they also need to exhibit incombustibility and low smoke emission.

Thus, plants involving the use of a variety of gases and chemicals are equipped with piping and ducting made of incombustible polyvinyl chloride or fiber-reinforced plastic. These systems are less likely to be ignited and emit smoke. In case of fire, however, the piping itself may disappear or disintegrate due to thermal deterioration at high temperature.

In order to reduce the risk of such disappearance and disintegration, metal piping and ducting may be used. Still, unfortunately, metal is likely to be corroded. In order to improve the corrosion resistance of a metallic substrate, a method is known in which the surface of a metallic substrate is coated with a synthetic resin. The components of this synthetic resin contain various compounds giving incombustibility and corrosion resistance.

For example, Patent Literature 1 discloses an epoxy resin powder coating material containing no halogen flame retarder and exhibiting excellent incombustibility. This epoxy resin powder coating material is an incombustible epoxy resin powder coating material that contains an epoxy resin, a curing agent, a filler, a laser color former, and a phosphoric acid ester-based flame retarder. The epoxy resin powder coating material has a coefficient of thermal expansion of $10 \times 10^{-5}/°$ C. or lower at the glass transition temperature thereof or higher.

Patent Literature 2 discloses a non-flammable powder coating material that contains a greatly reduced amount of a flame retarder without reliability reduction. This non-flammable epoxy resin powder coating material essentially contains an epoxy resin, a curing agent, and an inorganic filler, with the inorganic filler being present in an amount of 75 to 95% by weight of the whole powder coating material.

Patent Literature 3 discloses an epoxy resin powder coating material for a varistor exhibiting excellent incombustibility even without a halogen material. This epoxy resin powder coating material for a varistor is used for outer packaging of a varistor. The epoxy resin powder coating material for a varistor contains an epoxy resin, a curing agent, a phosphoric acid ester-based flame retarder, and a copper compound. In a varistor voltage test on a varistor packaged with the epoxy resin powder coating material for a varistor before and after pressure cooker treatment at 2 atmospheric pressure, 121° C., and 100% RH for 24 hours, the voltage change percentage before and after the pressure cooker treatment expressed by $\Delta 1(\%) = (1 - V1/V_0 1) \times 100$ is 5% or lower, wherein $V_0 1$ and $V1$ each represent the voltage with a current leakage of 1 mA.

Patent Literature 4 discloses, as another powder coating material, an epoxy resin powder coating material for an electronic component satisfying both short-time curing and heat cycle resistance. The epoxy resin powder coating material for an electronic component contains an epoxy resin composition that contains (A) an epoxy resin, (B) a curing agent, and (C) an inorganic filler. The component (B) is an acid-terminal polyester having an acid value of 40 to 80 mgKOH/g and a softening point of 100° C. to 130° C., and the proportion thereof is such that the number of carboxyl groups is 0.7 to 1.2 per epoxy group of the component (A). The amount of the component (C) is 35 to 60 parts by mass relative to 100 parts by mass in total of the component (A), the component (B), and the component (C).

CITATION LIST

Patent Literature

Patent Literature 1: JP 2012-255139 A
Patent Literature 2: JP 2000-226538 A
Patent Literature 3: JP 2015-183121 A
Patent Literature 4: JP 2010-155893 A

SUMMARY OF INVENTION

Technical Problem

As described above, plants involving the use of a variety of gases and chemicals have an explosion risk in case of fire. Further, since a large amount of smoke may be emitted in case of fire, devices and machines have a risk of being corroded and broken by the smoke. This leads to a demand for a powder coating material capable of providing a film exhibiting better incombustibility and low smoke emission than conventional powder coating materials.

In view of the above current state of the art, the invention aims to provide a powder coating material capable of providing a film exhibiting excellent incombustibility and low smoke emission.

Solution to Problem

The invention relates to a powder coating material containing a main material resin containing an epoxy resin; a phosphorus flame retarder; and at least one inorganic particulate substance selected from the group consisting of metal hydroxides and hydrous metal compounds, the inorganic particulate substance having an average particle size of 0.01 to 9 μm, the inorganic particulate substance being present in an amount of 80 to 200 parts by mass relative to 100 parts by mass of the main material resin.

Preferably, the phosphorus flame retarder is a phosphoric acid ester and the inorganic particulate substance is at least one selected from the group consisting of aluminum hydroxide and hydrated alumina.

The phosphorus flame retarder is preferably present in an amount of 5 to 50 parts by mass relative to 100 parts by mass of the main material resin.

The phosphorus flame retarder and the inorganic particulate substance preferably give a mass ratio of 5/95 to 25/75.

The invention also relates to a laminate including a substrate and a resin layer containing the above powder coating material.

The resin layer preferably has a thickness of at least 50 µm.

The substrate is preferably a stainless steel substrate.

The laminate may be used such that the resin layer is brought into contact with a corrosive fluid.

The laminate may be used in a building equipped with a semiconductor manufacturing apparatus, a flat panel display manufacturing apparatus, or a solar cell manufacturing apparatus.

The invention also relates to a pipe including an outer layer and an inner layer containing the above powder coating material.

The inner layer preferably has a thickness of at least 50 µm.

The outer layer is preferably a stainless steel tubular part.

The pipe may be used to convey a corrosive fluid.

The pipe may be installed in a building equipped with a semiconductor manufacturing apparatus, a flat panel display manufacturing apparatus, or a solar cell manufacturing apparatus.

Advantageous Effects of Invention

The powder coating material of the invention, which has the above structures, can be a powder coating material capable of providing a film exhibiting excellent incombustibility and low smoke emission.

The laminate of the invention exhibits excellent incombustibility and low smoke emission, and thus is less likely to disappear and disintegrate due to thermal deterioration.

The pipe of the invention exhibits excellent incombustibility and low smoke emission, and thus is less likely to disappear and disintegrate due to thermal deterioration.

DESCRIPTION OF EMBODIMENTS

The invention will be specifically described hereinbelow.

The powder coating material of the invention contains a main material resin containing an epoxy resin; a phosphorus flame retarder; and at least one inorganic particulate substance selected from the group consisting of metal hydroxides and hydrous metal compounds, the inorganic particulate substance having an average particle size of 0.01 to 9 µm, the inorganic particulate substance being present in an amount of 80 to 200 parts by mass relative to 100 parts by mass of the main material resin.

The epoxy resin is preferably a solid epoxy resin. Examples of the epoxy resin include bisphenol A epoxy resin, bisphenol F epoxy resin, bisphenol S epoxy resin, phenol novolac epoxy resin, fluorene epoxy resin, biphenyl epoxy resin, naphthalene epoxy resin, adamantane epoxy resin, and alicyclic epoxy resin. Preferred is bisphenol A epoxy resin, more preferred is one obtainable by a reaction between 2,2-bis (4-hydroxyphenyl) propane (bisphenol A) and a halo epoxide such as epichlorohydrin or β-methyl epichlorohydrin. One of these epoxy resins may be used alone, or a plurality thereof may be used in combination.

The epoxy resin preferably has an epoxy equivalent of 500 to 2500 g/eq, more preferably 800 to 1000 g/eq. The epoxy resin having an epoxy equivalent within the above range can lead to excellent storage stability of the powder coating material.

The main material resin may contain 0 to 500 parts by mass, preferably 0 to 100 parts by mass, of a different thermosetting resin other than the epoxy resin relative to 100 parts by mass of the epoxy resin. The main material resin is more preferably free from a different thermosetting resin.

The absence of a different thermosetting resin enables formation of a film exhibiting better corrosion resistance.

The different thermosetting resin may be any thermosetting resin usually used as a material of a powder coating material. Examples thereof include polyester resin, acrylic resin, polyurethane resin, and fluororesin.

Examples of the phosphorus flame retarder include phosphoric acid ester compounds such as triphenyl phosphate, tris nonylphenyl phosphate, resorcinol bis(diphenyl phosphate), resorcinol bis[di(2,6-dimethylphenyl)phosphate], 2,2-bis{4-[bis(phenoxy)phosphoryloxy]phenyl}propane, 2,2-bis{4-[bis(methylphenoxy)phosphoryloxy]phenyl}propane, trimethyl phosphate, triethyl phosphate, tributyl phosphate, trioctyl phosphate, tributoxyethyl phosphate, tricresyl phosphate, cresylphenyl phosphate, octyldiphenyl phosphate, and diisopropylphenyl phosphate; phosphoric acid esters such as aromatic condensed phosphoric acid esters; red phosphorus; and ammonium phosphate.

In order to provide a film exhibiting excellent corrosion resistance, the phosphorus flame retarder is preferably any of the phosphoric acid esters.

In order to achieve much better incombustibility and corrosion resistance, the powder coating material preferably satisfies that the phosphorus flame retarder is present in an amount of 5 to 50 parts by mass, more preferably 10 to 20 parts by mass, relative to 100 parts by mass of the main material resin.

Examples of the metal hydroxides include aluminum hydroxide, magnesium hydroxide, and calcium hydroxide.

Examples of the hydrous metal compounds include dawsonite, alumina calcium oxide, dypsum dihydrate, zinc borate, barium metaborate, borax, kaolin clay, calcium carbonate, and hydrated alumina.

In order to provide a film exhibiting excellent corrosion resistance, the inorganic particulate substance is preferably at least one selected from the group consisting of aluminum hydroxide and hydrated alumina.

In order to achieve much better incombustibility and low smoke emission, the inorganic particulate substance preferably has an average particle size of 5 µm or smaller, more preferably 3 µm or smaller, still more preferably 0.8 to 3 µm. The average particle size is a volume-based median size determined by laser diffraction.

In order to achieve much better incombustibility and low smoke emission, the powder coating material preferably satisfies that the inorganic particulate substance is present in an amount of 120 to 150 parts by mass relative to 100 parts by mass of the main material resin. Too small an amount of the inorganic particulate substance may fail to sufficiently improve the low smoke emission, while too large an amount of the inorganic particulate substance may cause difficulty in providing a film.

In order to achieve much better low smoke emission, the powder coating material preferably satisfies that the phosphorus flame retarder and the inorganic particulate substance give a mass ratio of 5/95 to 25/75, more preferably 10/90 to 20/80, still more preferably 10/90 to 15/85.

In order to provide a film exhibiting excellent corrosion resistance, the powder coating material preferably satisfies that the phosphorus flame retarder is a phosphoric acid ester and the inorganic particulate substance is at least one selected from the group consisting of aluminum hydroxide and hydrated alumina.

The powder coating material preferably further contains a curing agent. Examples of the curing agent include aliphatic amines, aromatic amines, modified amines, polyamide resins, secondary amines, tertiary amines, imidazoles, liquid polymercaptan, acid anhydrides, phenols, cresols, xylenols, novolacs, and latent curing agents. Preferred among these is diethylenetriamine, trimellitic anhydride, or dicyandiamide.

The powder coating material preferably satisfies that the curing agent is present in an amount of 1 to 50 parts by mass, more preferably 3 to 10 parts by mass, relative to 100 parts by mass of the main material resin.

The powder coating material may contain less than 30 parts by mass of an organic compound (other than the curing agent) other than the main material resin and the phosphorus flame retarder relative to 100 parts by mass of the main material resin, and is preferably substantially free from an organic compound other than the main material resin and the phosphorus flame retarder. The presence of an organic compound other than the main material resin and the phosphorus flame retarder in an amount of 30 parts by mass or more relative to 100 parts by mass of the main material resin may affect the incombustibility, the low smoke emission, and the adhesion to a substrate.

The phrase "substantially free from an organic compound other than the main material resin and the phosphorus flame retarder" as used herein means that the amount of the organic compound other than the main material resin and the phosphorus flame retarder is 10 parts by mass or less relative to 100 parts by mass of the main material resin. Examples of the organic compound other than the main material resin and the phosphorus flame retarder include, but are not limited to, polyethylene resin, polypropylene resin, polyvinyl chloride resin, polystyrene resin, acrylonitrile-butadiene-styrene resin, acrylonitrile-styrene resin, polycarbonate resin, polyacetal resin, polyethylene terephthalate resin, polybutylene terephthalate resin, polyamide-imide resin, melamine resin, urea resin, silicone resin, polyamide resin, polysulfone resin, polyethersulfone resin, polyphenyl sulfide resin, polyarylate resin, polyamide-imide resin, polyetherimide resin, polyether ether ketone resin, acrylonitrile butadiene rubber, acrylic rubber, butadiene rubber, epoxy-modified butadiene rubber, and isoprene rubber.

The powder coating material of the invention is different from conventionally known varnish in that it is substantially free from a solvent. The powder coating material of the invention can provide a thicker film (resin layer) than varnish.

The powder coating material may be produced by a method including melt-kneading the main material resin, the phosphorus flame retarder, the inorganic particulate substance, and optionally the curing agent and pulverizing the resulting product kneaded to provide a powder having a desired shape. The pulverization may be followed by classification.

The invention also relates to a laminate including a substrate and a resin layer containing the powder coating material.

The laminate may further include a different layer as long as it includes the substrate and the resin layer. In order to achieve good corrosion resistance in the presence of a different layer, the resin layer preferably constitutes the outermost layer. In order to achieve good adhesion, the resin layer is preferably in direct contact with the substrate without any layer in between.

In order to reduce disappearance and disintegration of the laminate, the substrate is preferably a metallic substrate. The laminate, which includes the resin layer, exhibits excellent adhesion between the substrate and the resin layer and excellent corrosion resistance even when the substrate is a metallic substrate. In order to achieve much better corrosion resistance, the substrate is more preferably a stainless steel substrate.

Corrosive gases such as ammonia and hydrogen chloride more easily corrode metal in a wet atmosphere than in a dry atmosphere. The laminate, which has the above structure, exhibits excellent incombustibility and is less likely to be corroded even when the resin layer is brought into contact with a corrosive fluid containing a corrosive gas dissolved in a solvent such as water.

The laminate may be produced by a production method including forming the resin layer from the powder coating material of the invention on the substrate.

The resin layer may be produced, for example, by electrostatic coating of the substrate with the powder coating material, fluidized bed coating of the substrate with the powder coating material, or rotolining of the substrate with the powder coating material.

In the above process, application of the powder coating material may be followed by curing of the resulting film. The curing can provide the resin layer which is a cured film. The curing may be performed by leaving the film at 120° C. to 250° C. for 10 to 90 minutes.

In order to achieve much better corrosion resistance, the resin layer preferably has a thickness of at least 50 μm, more preferably at least 100 μm. The thickness of the resin layer may be 50 to 1000 μm, and may be 100 to 500 μm.

Semiconductor manufacturing apparatuses, flat panel display manufacturing apparatuses, and solar cell manufacturing apparatuses require high cleanliness. If these apparatuses are contaminated with the smoke of a fire, restoration thereof involves serious difficulty. Thus, components in buildings equipped with these apparatuses need to have a structure which emits smoke as low as possible even in case of fire. At the same time, these apparatuses often involve the use of corrosive fluids, and thus components to be used therefor need to exhibit corrosion resistance. The laminate exhibits excellent incombustibility, low smoke emission, and corrosion resistance, and thus is suitably used in a building equipped with a semiconductor manufacturing apparatus, a flat panel display manufacturing apparatus, or a solar cell manufacturing apparatus. In particular, the laminate can be used such that the resin layer is brought into contact with a corrosive fluid.

Examples of the corrosive fluid include ammonia gas, hydrogen chloride gas, hydrogen sulfide gas, ammonia water, hydrochloric acid, and sulfuric acid.

The invention also relates to a pipe including an outer layer and an inner layer containing the powder coating material.

The pipe may further include a different layer as long as it includes the inner layer and the outer layer. In order to achieve good corrosion resistance in the presence of a different layer, the inner layer preferably constitutes the innermost layer. In order to achieve good adhesion, the inner layer is preferably in direct contact with the outer layer without any layer in between.

In order to reduce disappearance and disintegration of the pipe, the outer layer is preferably a metallic tubular part. The pipe, which includes the inner layer, exhibits excellent adhesion between the inner layer and the outer layer and excellent corrosion resistance even when the outer layer is a metallic tubular part. In order to achieve much better corrosion resistance, the outer layer is more preferably a stainless steel tubular part.

The pipe, which has the above structure, exhibits excellent incombustibility and is less likely to be corroded even when the pipe conveys a corrosive fluid. The pipe may be piping or ducting, and may be exhaust piping or exhaust ducting.

The pipe may be produced by a production method including forming the inner layer from the powder coating material of the invention on an inner surface of the outer layer.

The inner layer may be produced, for example, by electrostatic coating of the inner surface of the outer layer with the powder coating material, fluidized bed coating of the inner surface of the outer layer with the powder coating material, or rotolining of the inner surface of the outer layer with the powder coating material.

In the above process, application of the powder coating material may be followed by curing of the resulting film. The curing can provide the inner layer which is formed of a cured film. The curing may be performed by leaving the film at 120° C. to 250° C. for 10 to 90 minutes.

In order to achieve much better corrosion resistance, the inner layer preferably has a thickness of at least 50 µm, more preferably at least 100 µm. The thickness of the inner layer may be 50 to 1000 µm, and may be 100 to 500 µm.

Semiconductor manufacturing apparatuses, flat panel display manufacturing apparatuses, and solar cell manufacturing apparatuses require high cleanliness. If these apparatuses are contaminated with the smoke of a fire, restoration thereof involves serious difficulty. Thus, components such as pipes in buildings equipped with these apparatuses need to have a structure which emits smoke as low as possible even in case of fire. At the same time, these apparatuses often use corrosive fluids, and thus pipes to be used therefor need to exhibit corrosion resistance. The pipe exhibits excellent incombustibility and corrosion resistance, and thus may be installed in a building equipped with a semiconductor manufacturing apparatus, a flat panel display manufacturing apparatus, or a solar cell manufacturing apparatus. In particular, the pipe can be used to convey a corrosive fluid.

EXAMPLES

The invention is described below with reference to, but not limited to, examples.

The parameters in the examples were determined as follows.

Corrosion Resistance

The powder coating material obtained in each example was electrostatically applied to stainless steel piping so as to have a thickness of about 200 µm, and left at 180° C. for 60 minutes. The resulting cured film was subjected to the following evaluation.

In conformity with ASTM D6943, the cured film was left at room temperature for one week using corrosive fluids (ammonia water, hydrochloric acid) at the respective concentrations shown in Table 1. Then, the cured film was evaluated in terms of color difference.

"Good" indicates $\Delta E<1.0$, while "Poor" indicates $\Delta E \geq 1.0$.

Incombustibility (Occurrence of Ignition)

The powder coating material obtained in each of the examples and the comparative examples was left at 180° C. for 60 minutes. The resulting cured product (2 mm thick) was brought into contact with flame for five minutes, and the occurrence of ignition was visually observed.

Incombustibility (Amount of Smoke Generated)

The powder coating material obtained in each of the examples and the comparative examples was left at 180° C. for 60 minutes. The resulting cured product (2 mm thick) was evaluated as follows.

In conformity with ASTM E662-05, NBS smoke chamber testing (flaming mode) was performed to determine the maximum amount of smoke generated (maximum specific optical density Ds max) during 20 minutes.

Example 1

First, 100 parts by mass of bisphenol A epoxy resin (epoxy equivalent 875 to 975 g/eq), 20 parts by mass of an aromatic condensed phosphoric acid ester, 130 parts by mass of aluminum hydroxide (average particle size 4 µm), and 3 parts by mass of dicyandiamide were melt-kneaded. Then, the mixture was cooled and finely pulverized. Thereby, a powder coating material was produced.

Examples 2 to 13 and Comparative Examples 1 to 6

A powder coating material was produced in the same manner as in Example 1, except that the components and the amounts thereof shown in Table 1 were used.

TABLE 1

| | Examples | | | | | | | | | | | | | Comparative Examples | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 | 6 |
| Epoxy resin | | | | | | | | | | | | | | | | | | | |
| Bisphenol A epoxy resin (epoxy equivalent 875 to 975 g/eq) | 100 | 100 | 100 | | 100 | 100 | 100 | 100 | 100 | 100 | 100 | 100 | 100 | 100 | 100 | 100 | 100 | 100 | 100 |
| Bisphenol A epoxy resin (epoxy equivalent 600 to 700 g/eq) | | | | 100 | | | | | | | | | | | | | | | |
| Flame retarder | | | | | | | | | | | | | | | | | | | |
| Aromatic condensed phosphoric acid ester | 20 | 20 | 20 | 20 | 20 | 20 | 20 | | | 20 | 20 | 20 | 20 | | 20 | 20 | 20 | 20 | |
| Ammonium phosphate | | | | | | | | 30 | | | | | | | | | | | |
| Tricresyl phosphate | | | | | | | | | 30 | | | | | | | | | | |
| Ethylenebispentabromobenzene | | | | | | | | | | | | | | 50 | | | | | |
| Inorganic particulate substance | | | | | | | | | | | | | | | | | | | |
| Aluminum hydroxide (average particle size 0.7 μm) | 130 | | | | | | | | | | | | | | | | | | |
| Aluminum hydroxide (average particle size 2 μm) | | 130 | | | | | | | | | | | | | | | | | |
| Aluminum hydroxide (average particle size 4 μm) | | | 150 | 130 | 130 | 130 | | 130 | 130 | | | | 200 | 130 | 20 | 500 | | | |
| Aluminum hydroxide (average particle size 9 μm) | | | | | | | | | | | 130 | | | | | | | | |
| Aluminum hydroxide (average particle size 15 μm) | | | | | | | | | | 130 | | | | | | | 130 | | |
| Hydrated alumina (average particle size 5 μm) | | | | | | | 130 | | | | | | | | | | | | |
| Magnesium hydroxide (average particle size 5 μm) | | | | | | | | | | | | 50 | | | | | | | |
| Silica (average particle size 9 μm) | | | | | | | | | | | | | | | | | | 130 | 130 |

TABLE 1-continued

| | Examples | | | | | | | | | | | | | Comparative Examples | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 | 6 |
| Curing agent | | | | | | | | | | | | | | | | | | | |
| Diethylenetriamine | | | | | 10 | | | | | | | | | | | | | | |
| Trimellitic anhydride | | | | | | 10 | | | | | | | | | | | | | |
| Dicyandiamide | 3 | 3 | 3 | 3 | | | 3 | 3 | 3 | 3 | 3 | 3 | 3 | 3 | 3 | 3 | 3 | 3 | 3 |
| Incombustibility | | | | | | | | | | | | | | | | | | | |
| Occurrence of ignition | Not occurred | Not occurred | Not occurred | Not occurred | Not occurred | Not occurred | Not occurred | Not occurred | Not occurred | Not occurred | Not occurred | Not occurred | Not occurred | Not occurred | Occurred | Film not formed | Not occurred | Not occurred | Occurred |
| Amount of smoke generated "maximum specific optical density Ds" | 242 | 170 | 278 | 233 | 264 | 248 | 274 | 201 | 243 | 189 | 285 | 290 | 157 | 535 | >900 | | 346 | 511 | 241 |
| Corrosion resistance | | | | | | | | | | | | | | | | | | | |
| 10% Hydrochloric acid | Good | Good | Good | Good | Good | Good | Poor | Poor | Good | Good | Good | Good | Poor | | | | | | |
| 25% Ammonia water | Good | Good | Good | Good | Good | Good | Good | Poor | Good | Good | Good | Good | Good | | | | | | |

The invention claimed is:

1. A powder coating material comprising:
a main material resin containing an epoxy resin;
a phosphorus flame retarder; and
an inorganic particulate substance having an average particle size of 0.01 to 9 μm,
the inorganic particulate substance being present in an amount of 80 to 200 parts by mass relative to 100 parts by mass of the main material resin, and
the inorganic particulate substance is aluminum hydroxide.

2. The powder coating material according to claim 1, wherein the phosphorus flame retarder is a phosphoric acid ester.

3. The powder coating material according to claim 1, wherein the phosphorus flame retarder is present in an amount of 5 to 50 parts by mass relative to 100 parts by mass of the main material resin.

4. The powder coating material according to claim 1, wherein the phosphorus flame retarder and the inorganic particulate substance give a mass ratio of 5/95 to 25/75.

5. A laminate comprising:
a substrate; and
a resin layer containing the powder coating material according to claim 1.

6. The laminate according to claim 5, wherein the resin layer has a thickness of at least 50 μm.

7. The laminate according to claim 5, wherein the substrate is a stainless steel substrate.

8. A pipe comprising:
an outer layer; and
an inner layer containing a powder coating material comprising:
a main material resin containing an epoxy resin;
a phosphorus flame retarder; and
at least one inorganic particulate substance selected from the group consisting of metal hydroxides and hydrous metal compounds,
the inorganic particulate substance having an average particle size of 0.01 to 9 μm,
the inorganic particulate substance being present in an amount of 80 to 200 parts by mass relative to 100 parts by mass of the main material resin.

9. The pipe according to claim 8, wherein the inner layer has a thickness of at least 50 μm.

10. The pipe according to claim 8, wherein the outer layer is a stainless steel tubular part.

11. The pipe according to claim 8, wherein the pipe is installed in a building equipped with a semiconductor manufacturing apparatus, a flat panel display manufacturing apparatus, or a solar cell manufacturing apparatus.

* * * * *